(12) United States Patent
Zhang et al.

(10) Patent No.: US 10,723,668 B2
(45) Date of Patent: Jul. 28, 2020

(54) SPECIAL FILM-COATED RELEASE CALCIUM FERTILIZER FOR PEANUT AND PREPARATION PROCESS THEREOF

(71) Applicant: Biotechnology Research Center, Shandong Academy of Agricultural Sciences, Jinan, Shandong (CN)

(72) Inventors: Jialei Zhang, Shandong (CN); Shubo Wan, Shandong (CN); Xinguo Li, Shandong (CN); Feng Guo, Shandong (CN); Sha Yang, Shandong (CN); Yun Geng, Shandong (CN); Zheng Zhang, Shandong (CN); Jingjing Meng, Shandong (CN); Chaohui Tang, Shandong (CN)

(73) Assignee: BIOTECHNOLOGY RESEARCH CENTER, SHANDONG ACADEMY OF AGRICULTURAL SCIENCES, Jinan (CN)

( * ) Notice: Subject to any disclaimer, the term of this patent is extended or adjusted under 35 U.S.C. 154(b) by 0 days.

(21) Appl. No.: 16/304,780

(22) PCT Filed: Jul. 18, 2018

(86) PCT No.: PCT/CN2018/096186
§ 371 (c)(1),
(2) Date: Nov. 27, 2018

(87) PCT Pub. No.: WO2019/015622
PCT Pub. Date: Jan. 24, 2019

(65) Prior Publication Data
US 2019/0315664 A1  Oct. 17, 2019

(30) Foreign Application Priority Data
Jul. 21, 2017 (CN) .......................... 2017 1 0598404

(51) Int. Cl.
*C05G 5/12* (2020.01)
*C05C 5/04* (2006.01)
(Continued)

(52) U.S. Cl.
CPC .................. *C05G 5/12* (2020.02); *C05C 5/04* (2013.01); *C05C 9/02* (2013.01); *C05F 3/00* (2013.01); *C05F 5/002* (2013.01); *C05F 11/02* (2013.01)

(58) Field of Classification Search
CPC ........... C05B 7/00; C05D 3/00; C05G 3/0011; C05G 3/04; C05F 3/00; C05F 11/02; C05C 9/02; A01C 21/005
See application file for complete search history.

(56) References Cited

U.S. PATENT DOCUMENTS

2012/0090366 A1   4/2012   Pursell et al.

FOREIGN PATENT DOCUMENTS

| CN | 101575237 A | 11/2009 |
|---|---|---|
| CN | 103193546 A | 7/2013 |

(Continued)

OTHER PUBLICATIONS

International Search Report (PCT/ISA/210) dated Sep. 20, 2018, by the State Intellectual Property Office of China as the International Searching Authority for International Application No. PCT/CN2018/096186.
(Continued)

*Primary Examiner* — Jennifer A Smith
(74) *Attorney, Agent, or Firm* — Buchanan Ingersoll & Rooney PC

(57) ABSTRACT

A special film-coated controlled release calcium fertilizer for peanut includes a three-layer structure. Raw materials in an inner layer include calcium nitrate, humic acid, seaweed extract and adhesive. Raw materials in an intermediate layer
(Continued)

include calcium nitrate, urea formaldehyde powder and chitosan oligosaccharide. Raw materials in an outer layer include urea formaldehyde powder and fermented livestock and poultry manure. The special controlled release calcium fertilizer for peanut releases Ca since the pod-bearing stage after the basal application. The coating film is a biodegradable film, releases calcium since about 50 days after application into soil.

6 Claims, 1 Drawing Sheet

(51) Int. Cl.
*C05C 9/02* (2006.01)
*C05F 3/00* (2006.01)
*C05F 5/00* (2006.01)
*C05F 11/02* (2006.01)

(56) References Cited

FOREIGN PATENT DOCUMENTS

| CN | 105198619 A | 12/2015 |
| CN | 107382460 A | 11/2017 |
| KR | 20090103059 A | 10/2009 |

OTHER PUBLICATIONS

Written Opinion (PCT/ISA/237) dated Sep. 20, 2018, by the State Intellectual Property Office of China as the International Searching Authority for International Application No. PCT/CN2018/096186.
English Translation of Written Comment of the International Searching Authority dated Sep. 20, 2018, by the State Intellectual Property Office of the People's Republic of China in corresponding International Patent Application No. PCT/CN2018/096186, previously cited on Nov. 27, 2018. (4 pages).

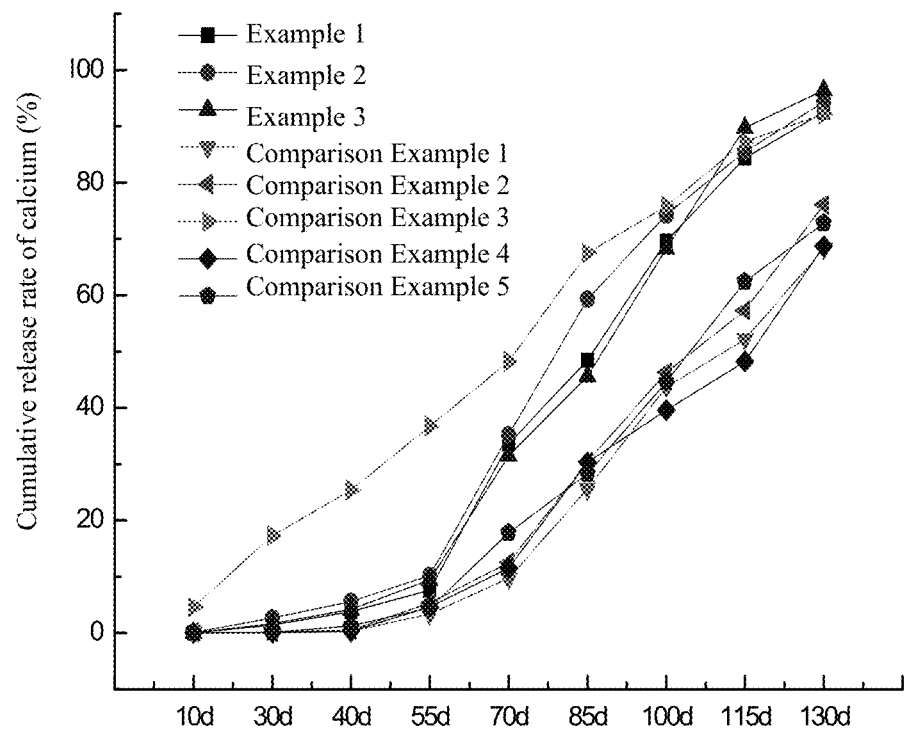

SPECIAL FILM-COATED RELEASE CALCIUM FERTILIZER FOR PEANUT AND PREPARATION PROCESS THEREOF

TECHNICAL FIELD

The invention relates to the field of controlled release fertilizer technology, in particular to a special film-coated controlled release calcium fertilizer for peanut, and further to a preparation process of the special film-coated controlled release calcium fertilizer for peanut.

BACKGROUND

Peanut is a crop requiring a large amount of calcium (Ca). In case of Ca deficiency, peanut will be tender with etiolated stem and leaves, and slow plant growth. Ca deficiency has greater effect on the reproductive organ, which is mainly reflected as flower abortion, pod atrophy, black germ in seed kernel, germination rate loss or low survival rate of seedlings. Ca can strengthen metabolism of nitrogen and carbohydrates, promote transport and distribution of protein and other nutrients to seed kernel, reduce hollow pod, and improve pod plumpness of peanut.

Peanut is a crop requiring a large amount of potassium (K). K can activate a variety of enzymes, promote photosynthesis and carbohydrate metabolism, accelerate transport and accumulation of substances, promote growth and development of peanut plants, and improve pod yield and kernel quality. K can still enhance the regulation effects of cells on external environmental conditions, improve the drought resistance and cold resistance of peanut, and enhance the lodging resistance of plant.

Since Ca and K ions compete for the absorption sites on plasma membrane, high concentration of Ca inhibits K absorption, and the amount of K absorbed by peanut plant is decreased with the increase of Ca concentration in the pegging region. Peanut needs less Ca before the pod-bearing stage, but needs much K in the early growth stage. In order to avoid competitive absorption of K and Ca in production, the most effective method includes basal application of potassium fertilizer, and top application of calcium fertilizer in the pegging stage. However, top application of calcium fertilizer is labor-consuming and time-consuming, and peanut mulched in a plastic film is not convenient for furrowing for top application.

CN103193546A discloses a special double film-coated inorganic fertilizer for peanut, where the weight ratio of raw materials in an inner layer is as follows: 5-8 parts of urea, 8-10 parts of ferrous sulfate, 20-25 parts of normal calcium superphosphate, and the coating film material includes 3 parts of gelatin, 3 parts of sulfur and 2 parts of sodium silicate; and the weight ratio of raw materials in an outer layer is as follows: 5-10 parts of urea, 15-20 parts of diammonium phosphate, 15-20 parts of potassium sulfate, 1-2 parts of zinc sulfate, and 5-10 parts of attapulgite clay powder. Once-through application of the double film-coated fertilizer can meet the nutrient requirements of peanut in different growth stages. Attapulgite clay powder is used as a fast dissolving fertilizer adhesive, is rich in trace elements, and enriches soil nutrients. With inorganic fertilizers commonly used in production as raw materials, the fertilizer does not pollute the environment or crops, is characterized by reasonable formula, balanced nutrients and better use effects, can significantly improve the fertilizer utilization rate, and improve the peanut yield and quality. However, its outer layer material is very easily decomposed, and has no controlled release effect.

Many sustained release and controlled release fertilizers in the prior art are special for some crops, and do not have so obvious effects on other crops. Therefore, specially developing a controlled release fertilizer suitable for fertilizer demands of peanut in different growth stages is a research direction.

SUMMARY

In order to solve the problems of different demands for calcium fertilizer and potassium fertilizer of peanut in different growth stages in the prior art, and labor-consuming, time-consuming and inconvenient top application operation of calcium fertilizer at present, the application discloses a special film-coated controlled release calcium fertilizer for peanut that has controlled-release effects, and releases Ca since the pod-bearing stage after the basal application.

The invention further discloses a preparation process of the special film-coated controlled release calcium fertilizer for peanut.

The invention is implemented using the following measures:

a special film-coated controlled release calcium fertilizer for peanut includes a three-layer structure, where raw materials in an inner layer include 55-75 parts of calcium nitrate, 15-30 parts of humic acid, 10-20 parts of seaweed extract, and 10-50 parts of adhesive;

raw materials in an intermediate layer include 15-25 parts of calcium nitrate, 10-15 parts of urea formaldehyde powder, and 0.001-0.1 part of chitosan oligosaccharide; and raw materials in an outer layer include 30-50 parts of urea formaldehyde powder, and 20-30 parts of fermented livestock and poultry manure.

In the special film-coated controlled release calcium fertilizer for peanut, the fermented livestock and poultry manure is obtained from the following steps:

mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing; and 1 mL of the fermentation agent contains $1\text{-}1.5\times10^9$ *Streptococcus thermophilus*, $0.3\text{-}0.5\times10^8$ IU neutral protease, $0.1\text{-}0.2\times10^6$ IU cellulase, $3\text{-}4\times10^5$ IU triacylglycerol acylhydrolase, $1\text{-}2\times10^5$ IU beer yeast and $3\text{-}4\times10^6$ IU *Bacillus subtilis*.

The special film-coated controlled release calcium fertilizer for peanut includes a three-layer structure, where the raw materials in the inner layer include 75 parts of calcium nitrate, 20 parts of humic acid, 20 parts of seaweed extract, and 40 parts of adhesive;

the raw materials in the intermediate layer include 20 parts of calcium nitrate, 15 parts of urea formaldehyde powder, and 0.1 part of chitosan oligosaccharide; and the raw materials in the outer layer include 40 parts of urea formaldehyde powder, and 30 parts of fermented livestock and poultry manure.

A preparation process of the special film-coated controlled release fertilizer for peanut includes the following steps:

(1) mixing the raw materials calcium nitrate, humic acid, seaweed extract and adhesive in the inner layer, granulating and drying to obtain granules in the inner layer;

(2) mixing the raw materials calcium nitrate, urea formaldehyde powder and chitosan oligosaccharide in the intermediate layer, adding the granules in the inner layer obtained in step (1), granulating and drying to obtain granules in the intermediate layer; and (3) mixing the raw materials urea formaldehyde powder and fermented livestock and poultry manure in the outer layer, adding the granules in the intermediate layer obtained in step (2), granulating and drying.

In the preparation process, the raw materials in the intermediate layer in step (2) preferably coat the granules in the inner layer at a rate of 200-300 mg/g.

In the preparation process, the raw materials in the outer layer in step (3) preferably coat the granules in the intermediate layer at a rate of 350-450 mg/g.

The controlled release fertilizer according to the invention has the following criteria:

1. at a temperature of 25° C., the nutrient release rate of the fertilizer (chemical substance form in the fertilizer converted to an effective form available for plant) does not exceed 3% within 24 hours, 2. the nutrient release rate does not exceed 10% within 28 days or 1 month, 3. the nutrient release rate is not less than 75% within the required time, and 4. The nutrient release curve of the special controlled release fertilizer complies with the nutrient absorption curve of the corresponding crop.

The film-coated calcium fertilizer is mainly prepared from water-soluble calcium nitrate, humic acid, seaweed extract and chitosan oligosaccharide. The seaweed extract retains abundant minerals, such as K, Ca, Mg, Fe, Mn, Zn and I, and natural active ingredients, such as vitamins, in seaweed, promotes growth, and inhibits plant senescence. The chitosan oligosaccharide is recognized by plant cells to induce many defensive reactions, such as systemic acquired resistance, improve the drought resistance and cold resistance of peanut and prevent premature senescence.

The invention has the following beneficial effects:

The special controlled release calcium fertilizer for peanut according to the invention releases Ca since the pod-bearing stage after the basal application, not only avoids Ca inhibition of K absorption in the early growth stage of peanut, but also reduces the workload, increases the pod yield, and improves the seed kernel quality. The coating film is a biodegradable film, releases calcium since about 50 days after application into soil. The nutrient release curve complies with the nutrient absorption curve of peanut. The fertilizer ensures the nutrient requirements of peanut throughout the growth period, and has a positive effect on improving the peanut yield and seed kernel quality.

BRIEF DESCRIPTION OF THE DRAWINGS

FIG. 1 shows the comparison of calcium release rates on different days in the examples and the comparison examples.

DESCRIPTION OF THE EMBODIMENTS

In order to better understand the invention, the invention is further described below in conjunction with the examples.

EXAMPLE 1

A special film-coated controlled release calcium fertilizer for peanut includes a three-layer structure, where raw materials in an inner layer include 55 parts of calcium nitrate, 30 parts of humic acid, 10 parts of seaweed extract, and 50 parts of adhesive;

raw materials in an intermediate layer include 15 parts of calcium nitrate, 15 parts of urea formaldehyde powder, and 0.001 part of chitosan oligosaccharide; and raw materials in an outer layer include 50 parts of urea formaldehyde powder, and 20 parts of fermented livestock and poultry manure.

In the special film-coated controlled release calcium fertilizer for peanut, the fermented livestock and poultry manure is obtained from the following steps:

mixing 2 parts of chicken manure, 5 parts of sheep manure and 2 parts of cow dung at a weight ratio to obtain a blended manure, chopping crop stalks into 5-8 cm small fragments, fully mixing the crop stalks with the blended manure at a weight ratio of 2:8, stacking them in a 2 m wide and 0.8 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing; and 1 mL of the fermentation agent contains $1 \times 10^9$ *Streptococcus thermophilus*, $0.5 \times 10^8$ IU neutral protease, $0.1 \times 10^6$ IU cellulase, $4 \times 10^5$ IU triacylglycerol acylhydrolase, $1 \times 10^5$ IU beer yeast and $4 \times 10^6$ IU *Bacillus subtilis*.

A preparation process includes the following steps:

(1) mixing the raw materials calcium nitrate, humic acid, seaweed extract and adhesive in the inner layer, granulating and drying to obtain granules in the inner layer;

(2) mixing the raw materials calcium nitrate, urea formaldehyde powder and chitosan oligosaccharide in the intermediate layer, adding the granules in the inner layer obtained in step (1), granulating and drying to obtain granules in the intermediate layer; and (3) mixing the raw materials urea formaldehyde powder and fermented livestock and poultry manure in the outer layer, adding the granules in the intermediate layer obtained in step (2), granulating and drying.

EXAMPLE 2

A special film-coated controlled release calcium fertilizer for peanut includes a three-layer structure, where raw materials in an inner layer include 75 parts of calcium nitrate, 15 parts of humic acid, 20 parts of seaweed extract, and 10 parts of adhesive;

raw materials in an intermediate layer include 25 parts of calcium nitrate, 10 parts of urea formaldehyde powder, and 0.1 part of chitosan oligosaccharide; and raw materials in an outer layer include 30 parts of urea formaldehyde powder, and 30 parts of fermented livestock and poultry manure.

In the special film-coated controlled release calcium fertilizer for peanut, the fermented livestock and poultry manure is obtained from the following steps:

mixing 5 parts of chicken manure, 2 parts of sheep manure and 5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing; and 1 mL of the fermentation agent contains $1.5 \times 10^9$ *Streptococcus thermophilus*, $0.3 \times 10^8$ IU neutral protease, $0.2 \times 10^6$ IU cellulase, $3 \times 10^5$ IU triacylglycerol acylhydrolase, $2 \times 10^5$ IU beer yeast and $3 \times 10^6$ IU *Bacillus subtilis*.

A preparation process includes the following steps:

(1) mixing the raw materials calcium nitrate, humic acid, seaweed extract and adhesive in the inner layer, granulating and drying to obtain granules in the inner layer;

(2) mixing the raw materials calcium nitrate, urea formaldehyde powder and chitosan oligosaccharide in the intermediate layer, adding the granules in the inner layer obtained in step (1), granulating and drying to obtain granules in the intermediate layer; and (3) mixing the raw materials urea formaldehyde powder and fermented livestock and poultry manure in the outer layer, adding the granules in the intermediate layer obtained in step (2), granulating and drying.

EXAMPLE 3

A special film-coated controlled release calcium fertilizer for peanut includes a three-layer structure, where the raw materials in the inner layer include 75 parts of calcium nitrate, 20 parts of humic acid, 20 parts of seaweed extract, and 40 parts of adhesive;

the raw materials in the intermediate layer include 20 parts of calcium nitrate, 15 parts of urea formaldehyde powder, and 0.1 part of chitosan oligosaccharide; and the raw materials in the outer layer include 40 parts of urea formaldehyde powder, and 30 parts of fermented livestock and poultry manure.

The preparation of the fermented livestock and poultry manure is the same as that in Example 2.

A preparation process includes the following steps:

(1) mixing the raw materials calcium nitrate, humic acid, seaweed extract and adhesive in the inner layer, granulating and drying to obtain granules in the inner layer;

(2) mixing the raw materials calcium nitrate, urea formaldehyde powder and chitosan oligosaccharide in the intermediate layer, adding the granules in the inner layer obtained in step (1), granulating and drying to obtain granules in the intermediate layer; and (3) mixing the raw materials urea formaldehyde powder and fermented livestock and poultry manure in the outer layer, adding the granules in the intermediate layer obtained in step (2), granulating and drying.

COMPARISON EXAMPLE 1

The Comparison Example is the same as Example 3 except that the raw material fermented livestock and poultry manure in the outer layer was replaced with urea formaldehyde powder.

COMPARISON EXAMPLE 2

The Comparison Example is the same as Example 3 except that the raw material fermented livestock and poultry manure in the outer layer was not used.

COMPARISON EXAMPLE 3

The Comparison Example is the same as Example 3 except that the use level of the raw material fermented livestock and poultry manure in the outer layer was changed to 60 parts.

COMPARISON EXAMPLE 4

The Comparison Example is the same as Example 3 except that the raw material fermented livestock and poultry manure in the outer layer was replaced with dried, pulverized and unfermented blended manure.

COMPARISON EXAMPLE 5

The Comparison Example is the same as Example 3 except that the raw materials calcium nitrate and chitosan oligosaccharide in the intermediate layer were put in raw materials in the inner layer; urea formaldehyde powder was put in the raw materials in the outer layer; and the adjusted raw materials in the inner layer were granulated, then mixed with fully mixed and adjusted raw materials in the outer layer, and granulated.

EXAMPLE 4

Research on Controlled Release Properties

Controlled release properties of the nutrients in the controlled release fertilizer prepared in the Examples 1, 2 and 3 and in the Comparison Examples 1, 2, 3, 4 and 5 are evaluated using the soil culture method. The specific operation is as follows:

The controlled release fertilizer packed in a nylon net was applied to soil, the fertilizer weight was measured at regular intervals, and then the active ingredients were converted to obtain the nutrient contents released from the controlled release fertilizer, which were compared with the nutrient requirements of peanut in various growth stages.

The soil temperature and humidity of peanut in various stages were controlled as follows: daily average ground temperature: 15-20° C., moisture content: 60-70% in the early stage (seeding time to seedling stage); daily average ground temperature: 20-28° C., moisture content 70-80% in the intermediate stage (flowering stage to pod-bearing stage); and the daily average ground temperature: 28-35° C., moisture content: 60-70% in the later stage (fruit expansion stage to maturation stage).

| Processing | Cumulative release rate of calcium on different days (%) | | | | | | | | |
|---|---|---|---|---|---|---|---|---|---|
| | 10 d Before seedling stage | 30 d Seedling stage | 40 d Flowering stage | 55 d Pegging stage | 70 d Pod-bearing stage | 85 d Pod-bearing stage | 100 d Fruit expansion stage | 115 d Fruit expansion stage | 130 d Maturation stage |
| Example 1 | 0 | 1.4 | 3.8 | 7.6 | 33.6 | 48.4 | 69.6 | 84.4 | 92.5 |
| Example 2 | 0.1 | 2.7 | 5.6 | 10.2 | 35.2 | 59.3 | 74.3 | 85.5 | 94.3 |
| Example 3 | 0 | 1.6 | 4.2 | 9.4 | 31.5 | 45.6 | 68.3 | 89.7 | 96.4 |
| Comparison Example 1 | 0 | 0 | 0.3 | 3.4 | 9.7 | 25.6 | 43.7 | 52.1 | 68.3 |
| Comparison Example 2 | 0 | 0.2 | 0.5 | 5.3 | 12.5 | 30.4 | 46.3 | 57.3 | 76.1 |
| Comparison Example 3 | 4.6 | 17.3 | 25.4 | 36.7 | 48.2 | 67.5 | 75.8 | 87.3 | 92.2 |
| Comparison Example 4 | 0 | 0.1 | 0.3 | 4.6 | 11.5 | 30.3 | 39.6 | 48.2 | 68.7 |
| Comparison Example 5 | 0 | 0.1 | 1.3 | 4.5 | 17.8 | 28.3 | 44.6 | 62.4 | 72.8 |

In the Comparison Examples 1, 2, 4 and 5, the fertilizer is very slowly released, and insufficiently released in the pod-bearing stage, and some calcium is still not released in the maturation stage, thereby resulting in waste. In the Comparison Example 3, the release amount is very large before the pod-bearing stage, thereby resulting in losses of calcium, antagonism with potassium, and later calcium deficiency. (see table and figure)

EXAMPLE 5

Effects on Seed Kernel Quality

The controlled release fertilizer in the examples and the comparison examples was applied to an experimental material Huayu No. 22 along with seeding at a rate of 50 kg/Mu. The experiment was carried out by seeding on May 1 in an area of 40 m², and harvesting on September 20, and was repeated 3 times.

The yield increase and high quality effects are significant in the examples; the pod yield and kernel rate are highest in the Examples 1, 2 and 3, and second highest in the Comparison Examples 2, 5 and 1; and the yield is the lowest in the Comparison Examples 3 and 4. The protein content, total amino acid content, fat content, relative content of oleic acid, and O/L are highest in the Examples 1, 2 and 3, while the effects are relatively poor in the comparison examples, because in the comparison examples, calcium is released too late or too early, thereby failing to comply with the law of demand for calcium of peanut in different growth stages.

The above examples are preferred embodiments of the invention, but the embodiments of the invention are not limited to the examples. All alterations, modifications, combinations, substitutions and simplifications made without departing from the spiritual essence and principle of the invention shall be equivalent substitution modes, and shall be encompassed within the scope of protection of the invention.

What is claimed is:

1. A film-coated controlled release calcium fertilizer for peanut comprises a three-layer structure, wherein
   raw materials in an inner layer comprise 55-75 parts of calcium nitrate, 15-30 parts of humic acid, 10-20 parts of seaweed extract, and 10-50 parts of adhesive;
   raw materials in an intermediate layer comprise 15-25 parts of calcium nitrate, 10-15 parts of urea formaldehyde powder, and 0.001-0.1 part of chitosan oligosaccharide; and
   raw materials in an outer layer comprise 30-50 parts of urea formaldehyde powder, and 20-30 parts of fermented livestock and poultry manure.

2. The film-coated controlled release calcium fertilizer for peanut according to claim 1, wherein the fermented livestock and poultry manure is obtained from the following steps:
   mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with

| Processing | Pod yield (kg/667 m²) | Kernel rate (%) | Protein (%) | Fat (%) | Total amino acid (%) | Relative content of oleic acid (%) | O/L |
|---|---|---|---|---|---|---|---|
| Example 1 | 576.5 | 72.4 | 27.5 | 52.3 | 23.5 | 53.3 | 1.25 |
| Example 2 | 598.3 | 71.5 | 26.9 | 53.5 | 23.1 | 54.2 | 1.28 |
| Example 3 | 562.4 | 72.6 | 27.3 | 52.5 | 23.2 | 52.9 | 1.24 |
| Comparison Example 1 | 451.8 | 71.3 | 26.8 | 51.3 | 22.1 | 50.8 | 1.19 |
| Comparison Example 2 | 472.3 | 69.8 | 25.4 | 50.1 | 21.3 | 49.2 | 1.15 |
| Comparison Example 3 | 423.4 | 69.5 | 26.3 | 49.7 | 22.4 | 46.3 | 1.04 |
| Comparison Example 4 | 436.7 | 68.4 | 25.9 | 48.9 | 21.9 | 47.6 | 1.09 |
| Comparison Example 5 | 465.5 | 70.1 | 27.2 | 50.6 | 22.5 | 49.5 | 1.17 | the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60 oC until the pile temperature no longer rises, drying, and pulverizing;

wherein 1 mL of the fermentation agent contains $1-1.5 \times 10^9$ *Streptococcus thermophilus*, $0.3-0.5 \times 10^8$ IU neutral protease, $0.1-0.2 \times 10^6$ IU cellulase, $3-4 \times 10^5$ IU triacylglycerol acylhydrolase, $1-2 \times 10^5$ IU beer yeast and $3-4 \times 10^6$ IU *Bacillus subtilis*.

3. The film-coated controlled release calcium fertilizer for peanut according to claim 1 comprises a three-layer structure, wherein the raw materials in the inner layer comprise 75 parts of calcium nitrate, 20 parts of humic acid, 20 parts of seaweed extract, and 40 parts of adhesive;

the raw materials in the intermediate layer comprise 20 parts of calcium nitrate, 15 parts of urea formaldehyde powder, and 0.1 part of chitosan oligosaccharide; and the raw materials in the outer layer comprise 40 parts of urea formaldehyde powder, and 30 parts of fermented livestock and poultry manure.

4. A preparation process of the film-coated controlled release calcium fertilizer for peanut according to claim 1, comprising the following steps:

(1) mixing the raw materials calcium nitrate, humic acid, seaweed extract and adhesive in the inner layer, granulating and drying to obtain granules in the inner layer;

(2) mixing the raw materials calcium nitrate, urea formaldehyde powder and chitosan oligosaccharide in the intermediate layer, adding the granules in the inner layer obtained in step (1), granulating and drying to obtain granules in the intermediate layer; and (3) mixing the raw materials urea formaldehyde powder and fermented livestock and poultry manure in the outer layer, adding the granules in the intermediate layer obtained in step (2), granulating and drying.

5. The preparation process according to claim 4, wherein the raw materials in the intermediate layer in step (2) coat the granules in the inner layer at a rate of 200-300 mg/g.

6. The preparation process according to claim 4, wherein the raw materials in the outer layer in step (3) coat the granules in the intermediate layer at a rate of 350-450 mg/g.

* * * * *